US011143075B2

(12) United States Patent
Bunkus et al.

(10) Patent No.: US 11,143,075 B2
(45) Date of Patent: Oct. 12, 2021

(54) EXHAUST GAS AFTERTREATMENT SYSTEM AND METHOD FOR EXHAUST GAS AFTERTREATMENT IN AN INTERNAL COMBUSTION ENGINE

(71) Applicant: VOLKSWAGEN AKTIENGESELLSCHAFT, Wolfsburg (DE)

(72) Inventors: Johannes Bunkus, Wolfsburg (DE); Stephan Kellner, Wolfsburg (DE)

(73) Assignee: VOLKSWAGEN AKIIHNGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/698,257

(22) Filed: Nov. 27, 2019

(65) Prior Publication Data

US 2020/0173331 A1 Jun. 4, 2020

(30) Foreign Application Priority Data

Nov. 30, 2018 (DE) .................... 10 2018 220 715.1

(51) Int. Cl.
*F01N 3/035* (2006.01)
*F01N 3/10* (2006.01)
(Continued)

(52) U.S. Cl.
CPC .......... *F01N 3/2066* (2013.01); *F01N 3/035* (2013.01); *F01N 3/2033* (2013.01);
(Continued)

(58) Field of Classification Search
CPC .......... F01N 3/035; F01N 3/103; F01N 3/106; F01N 3/2033; F01N 3/2066;
(Continued)

(56) References Cited

U.S. PATENT DOCUMENTS 8,650,860 B2 * 2/2014 Applegate ............. F01N 3/0842
60/295
8,701,388 B2 * 4/2014 Gonze .................... F01N 3/035
60/286
(Continued)

FOREIGN PATENT DOCUMENTS

CN 101513592 A 8/2009
CN 103402610 A 11/2013
(Continued)

OTHER PUBLICATIONS

Search report for German Patent Application No. 10 2018 220 715.1, dated Jul. 22, 2019.

*Primary Examiner* — Audrey B Walter
(74) *Attorney, Agent, or Firm* — Pearl Cohen Zedek Latzer Baratz LLP

(57) ABSTRACT

An exhaust gas aftertreatment system for an internal combustion engine comprises an exhaust gas system with an exhaust gas channel in which at least two exhaust gas aftertreatment components for the selective, catalytic reduction of nitrogen oxides are arranged. Downstream from the first exhaust gas aftertreatment component and upstream from the second exhaust gas aftertreatment component is a burner with which the exhaust gas can be heated up before it enters the second exhaust gas aftertreatment component. Downstream from the second exhaust gas aftertreatment component is an oxidation catalytic converter that converts unburned hydrocarbons. In a method for exhaust gas aftertreatment in an internal combustion engine having such an exhaust gas aftertreatment system, the exhaust gas from the internal combustion engine is heated up by the burner in order to heat up the second exhaust gas aftertreatment component for the selective, catalytic reduction of nitrogen oxides.

5 Claims, 3 Drawing Sheets

(51) Int. Cl.
*F01N 3/20* (2006.01)
*F01N 13/00* (2010.01)
*F01N 3/08* (2006.01)

(52) U.S. Cl.
CPC ........ *F01N 13/0093* (2014.06); *F01N 3/0842* (2013.01); *F01N 3/103* (2013.01); *F01N 3/106* (2013.01); *F01N 13/009* (2014.06); *F01N 2250/02* (2013.01); *F01N 2570/14* (2013.01); *F01N 2610/02* (2013.01); *F01N 2610/03* (2013.01); *F01N 2900/1404* (2013.01); *F01N 2900/1602* (2013.01)

(58) Field of Classification Search
CPC ............... F01N 13/009; F01N 13/0093; F01N 2240/14; F01N 2610/02; F01N 2900/1404; F01N 2900/1602
See application file for complete search history.

(56) References Cited

U.S. PATENT DOCUMENTS

| | | | |
|---|---|---|---|
| 2004/0206069 A1 | 10/2004 | Tumati et al. | |
| 2008/0060348 A1* | 3/2008 | Robel | F01N 3/035 60/295 |
| 2009/0031702 A1 | 2/2009 | Robel | |
| 2009/0205325 A1 | 8/2009 | Kistner et al. | |
| 2012/0117949 A1 | 5/2012 | Miebach et al. | |
| 2013/0327023 A1* | 12/2013 | Schluter | F01N 3/08 60/274 |
| 2014/0033685 A1* | 2/2014 | Chandler | F02M 26/35 60/278 |
| 2014/0255281 A1 | 9/2014 | Chavannavar | |
| 2014/0363358 A1 | 12/2014 | Udd et al. | |
| 2015/0023853 A1 | 1/2015 | Wittrock et al. | |
| 2015/0086426 A1* | 3/2015 | DeGeorge | F01N 13/009 422/108 |
| 2016/0160769 A1 | 6/2016 | Döring | |
| 2018/0045097 A1* | 2/2018 | Tang | B01J 29/072 |
| 2018/0078898 A1 | 3/2018 | Andersen et al. | |
| 2018/0021651 A1 | 8/2018 | Boerensen et al. | |
| 2018/0280877 A1 | 10/2018 | Chen et al. | |

FOREIGN PATENT DOCUMENTS

| | | |
|---|---|---|
| DE | 10 2007 027 677 A1 | 12/2008 |
| DE | 10 2008 032 601 A1 | 1/2010 |
| DE | 10 2009 023550 A1 | 12/2010 |
| DE | 10 2014 017789 | 6/2016 |
| DE | 10 2016 205 182 A1 | 10/2017 |
| DE | 10 2017 201401 A | 8/2018 |
| DE | 10 2018 107548 | 10/2018 |
| EP | 1 469 173 B1 | 10/2010 |
| EP | 2795076 A1 | 10/2014 |
| EP | 2826971 A1 | 1/2015 |
| EP | 3073083 A1 | 9/2016 |
| EP | 3111066 A1 | 1/2017 |
| WO | WO 2015/130219 A1 | 9/2015 |

\* cited by examiner

EXHAUST GAS AFTERTREATMENT SYSTEM AND METHOD FOR EXHAUST GAS AFTERTREATMENT IN AN INTERNAL COMBUSTION ENGINE

CROSS-REFERENCE TO RELATED APPLICATION

This application claims priority from German Patent application No. 10 2018 220 715.1, filed Nov. 30, 2018, which is hereby incorporated by reference in its entirety.

FIELD OF THE INVENTION

The invention relates to an exhaust gas aftertreatment system for an internal combustion engine, especially for a diesel engine, as well as to a method for exhaust gas aftertreatment in such an internal combustion engine, according to the generic part of the independent claims.

BACKGROUND OF THE INVENTION

Current legislation on exhaust-gas emissions, which will become increasingly stringent in the future, makes high requirements in terms of raw engine emissions and in terms of exhaust gas aftertreatment in internal combustion engines. In this context, the requirements for lowering fuel consumption and the further tightening of the emissions standards regarding the permissible nitrogen oxide emissions ($NO_x$ emissions) pose a challenge to automotive design engineers. In the case of gasoline engines, the exhaust gas is cleaned in a known manner by means of a three-way catalytic converter as well as by additional catalytic converters installed upstream and downstream from the three-way catalytic converter. Diesel engines currently make use of exhaust gas aftertreatment systems that have an oxidation catalytic converter, a catalytic converter for the selective catalytic reduction of nitrogen oxides (SCR catalytic converter) as well as a particulate filter to separate out soot particles, and if applicable, additional catalytic converters. In this context, ammonia is preferably used as the reductant. Since the handling of pure ammonia is complicated, vehicles normally employ a synthetic, aqueous urea solution that is mixed with the hot stream of exhaust gas in a mixing device situated upstream from the SCR catalytic converter. This mixing process causes the aqueous urea solution to heat up, a process in which the aqueous urea solution releases ammonia in the exhaust gas channel. A commercially available, aqueous urea solution generally consists of 32.5% urea and 67.5% water.

Future emissions legislation will require the use of multi-stage components for the aftertreatment of nitrogen oxide emissions in diesel engines. This multi-stage exhaust gas aftertreatment is necessary in order to achieve a sufficient conversion of the pollutants in all temperature ranges. Thus, an exhaust gas aftertreatment system can have, for example, a $NO_x$ storage catalytic converter, a particulate filter with a coating for the selective catalytic reduction of nitrogen oxides and another SCR catalytic converter situated in the undercarriage of the motor vehicle. In order to prevent ammonia from slipping through the SCR catalytic converter and in order to oxidize the ammonia, an ammonia slip catalytic converter can be provided downstream from the last SCR catalytic converter. In this context, the appertaining components for the exhaust gas aftertreatment have to be heated up to a given operating temperature so that the temperature for a sufficient conversion of certain exhaust gas components is reached immediately after a cold start of the internal combustion engine, irrespective of the engine operating point and of the distance between the exhaust gas aftertreatment component and the internal combustion engine. Moreover, the particulate filter has to be regenerated at intervals, for which purpose an appropriately high exhaust gas temperature is needed in order to oxidize the soot particles that are held back in the particulate filter.

German patent application DE 10 2008 032 601 A1 discloses an exhaust gas aftertreatment system for an internal combustion engine in which an oxidation catalytic converter, a $NO_x$ storage catalytic converter downstream from the oxidation catalytic converter, an SCR catalytic converter downstream from the $NO_x$ storage catalytic converter and, further downstream, a particulate filter are all arranged. In this case, a feed point for hot exhaust gas from an exhaust gas burner is provided downstream from the SCR catalytic converter and upstream from the particulate filter so that the particulate filter can be heated up to its regeneration temperature.

German patent application DE 10 2016 205 182 A1 discloses an exhaust gas aftertreatment system for an internal combustion engine having a catalytically coated particulate filter and a $NO_x$ storage catalytic converter, whereby an exhaust gas burner is arranged upstream from the $NO_x$ storage catalytic converter and is operated at a substoichiometric air-fuel ratio so that the exhaust gas can be heated up and the $NO_x$ storage catalytic converter containing the unburned hydrocarbons from the exhaust gas of the burner can be simultaneously regenerated.

European patent specification EP 1 469 173 B1 discloses an exhaust gas aftertreatment system for an internal combustion engine in which an oxidation catalytic converter, an SCR catalytic converter downstream from the oxidation catalytic converter and, further downstream, a particulate filter are all arranged, as seen in the flow direction of the exhaust gas through the exhaust gas aftertreatment system. In this case, downstream from the oxidation catalytic converter and upstream from the SCR catalytic converter, there is a heat exchanger for cooling off the exhaust gas stream and there is a heating element downstream from the SCR catalytic converter and upstream from the particulate filter for heating the exhaust gas stream up to a regeneration temperature of the particulate filter before it enters the particulate filter.

A drawback of the prior-art solutions, however, is that, when the SCR catalytic converter is arranged in a position far away from the engine, especially in the undercarriage of a motor vehicle, there is a need for external heating measures in order to heat the SCR catalytic converter up to its operating temperature immediately after a cold start of the internal combustion engine. In this context, the heating output of an electric heating element is limited by the output of the battery, which is likewise limited at low outdoor temperatures, especially at temperatures below 0° C.

SUMMARY OF THE INVENTION

Before this backdrop, the invention is based on the objective of allowing at least one SCR catalytic converter to be heated up quickly after the cold start of the internal combustion engine, thus allowing an efficient conversion of nitrogen oxides immediately after a cold start.

According to the invention, this objective is achieved by an exhaust gas aftertreatment system for an internal combustion engine, comprising an exhaust gas system with an exhaust gas channel in which at least two exhaust gas aftertreatment components for the selective, catalytic reduction of nitrogen oxides are arranged. Here, the first exhaust gas aftertreatment component for the selective, catalytic reduction of nitrogen oxides is arranged directly downstream from the turbine of an exhaust gas turbocharger of the internal combustion engine. Downstream from the first exhaust gas aftertreatment component for the selective, catalytic reduction of nitrogen oxides and upstream from the second exhaust gas aftertreatment component for the selective, catalytic reduction of nitrogen oxides, there is a burner that is operated with the fuel of the internal combustion engine and with which the exhaust gas can be heated up before it enters the second exhaust gas aftertreatment component for the selective, catalytic reduction of nitrogen oxides. Downstream from the second exhaust gas aftertreatment component for the selective, catalytic reduction of nitrogen oxides, there is an oxidation catalytic converter that serves to convert unburned hydrocarbons and carbon monoxide into carbon dioxide and water vapor. The exhaust gas aftertreatment component for the selective, catalytic reduction of nitrogen oxides can be heated up by the exhaust gas burner essentially independently of the exhaust gas stream and independently of the exhaust gas temperature of the internal combustion engine, so that the exhaust gas aftertreatment component can be much more quickly heated up to its operating temperature, especially immediately after a cold start of the internal combustion engine. Consequently, a selective catalytic reduction of nitrogen oxides in the exhaust gas of the internal combustion engine can already be carried out immediately after the cold start, as a result of which the nitrogen oxide emissions can be reduced. In particular, even an exhaust gas aftertreatment component that is arranged in a position far away from the engine, for example, in the undercarriage of a motor vehicle, can also be heated up, thereby providing additional degrees of freedom when it comes to designing the exhaust gas system. Here, the first exhaust gas aftertreatment component for the selective, catalytic reduction of nitrogen oxides is preferably arranged in a position near the engine and the second exhaust gas aftertreatment component for selective, catalytic reduction is arranged in a position far away from the engine. In this context, the term "in a position near the engine" refers to a position in the exhaust gas system in which the face of the exhaust gas aftertreatment component on the inlet side has an exhaust gas travel distance of less than 80 cm, preferably less than 50 cm, as measured from the outlet of the internal combustion engine. In this context, the term "in a position far away from the engine" refers to a position in which the exhaust gas travel path amounts to more than 100 cm, preferably more than 150 cm, as measured from the outlet of the internal combustion engine. Owing to the different physical distances of the two exhaust gas aftertreatment components for the selective, catalytic reduction of nitrogen oxides, they reach different operating temperatures during the normal operation of the internal combustion engine because of the exhaust heat losses that occur via the exhaust gas channel. This expands the operating range of the internal combustion engine in which at least one of the two exhaust gas aftertreatment components for the selective, catalytic reduction of nitrogen oxides is operated within a temperature window needed for the reduction of the nitrogen oxides. Moreover, the oxidation catalytic converter can be heated up to its operating temperature immediately after a cold start, irrespective of its installation position in the exhaust gas system. The exhaust gas burner makes it possible to dispense with an oxidation catalytic converter near the engine, thereby providing additional degrees of freedom when it comes to designing the exhaust gas system. This is particularly advantageous in the case of tight engine compartments since—thanks to the upstream exhaust gas burner—the oxidation catalytic converter can also be arranged in the undercarriage of the motor vehicle.

The features put forward in the dependent claims constitute advantageous embodiments, improvements and refinements of the exhaust gas aftertreatment system presented in the independent claim.

In a preferred embodiment of the invention, it is provided for one of the exhaust gas aftertreatment components for the selective, catalytic reduction of nitrogen oxides to be configured as a particulate filter with a coating for the selective, catalytic reduction of nitrogen oxides and for the other exhaust gas aftertreatment component to be configured as an SCR catalytic converter. Thanks to the particulate filter with a coating for the selective, catalytic reduction of nitrogen oxides, the functionality of the particulate filter can be combined with the functionality of an SCR catalytic converter. In comparison to an SCR catalytic converter, however, such a particulate filter is more expensive to produce and also exhibits a greater flow resistance. Consequently, a combination of a coated particulate filter and an SCR catalytic converter constitutes an optimal compromise in terms of the exhaust gas aftertreatment, in terms of the costs and in terms of the flow resistance.

In a preferred embodiment of the exhaust gas aftertreatment system, it is provided for the oxidation catalytic converter to comprise an ammonia slip catalytic converter. A slip catalytic converter can prevent unconsumed reductant, especially ammonia, from being emitted into the environment. This prevents secondary emissions from the metering elements that serve to meter in an aqueous urea solution.

In a preferred embodiment of the invention, it is provided for the first exhaust gas aftertreatment component for the selective, catalytic reduction of nitrogen oxides to be associated with a first metering element that serves to meter in a reductant, especially a liquid urea solution. In addition, the second exhaust gas aftertreatment component for the selective, catalytic reduction of nitrogen oxides is associated with a second metering element that serves to meter a reductant into the exhaust gas channel. Since there are two independent metering elements, the reductant can always be metered in upstream from the specific exhaust gas aftertreatment component for the selective, catalytic reduction of nitrogen oxides for which the efficient conversion of the nitrogen oxides can be expected at the momentary operating point of the internal combustion engine. As an alternative, reductant can be metered in by both metering elements simultaneously in order to utilize the catalytically active volume of both exhaust gas aftertreatment components for the selective, catalytic reduction of nitrogen oxides.

In this context, it is especially preferred for an exhaust gas mixer to be arranged between the appertaining metering element and the appertaining exhaust gas aftertreatment component for the selective, catalytic reduction of nitrogen oxides. An exhaust gas mixer can improve the thorough mixing of the exhaust gas stream with the reductant, thereby shortening the mixing segment between the metering element and the inlet into the appertaining exhaust gas aftertreatment component for the selective, catalytic reduction of nitrogen oxides. A more thorough mixing of the exhaust gas and the reductant creates a more homogeneous exhaust gas, as a result of which the conversion capacity of the exhaust gas aftertreatment components can be improved.

In a preferred embodiment of the invention, it is provided for the burner to be arranged upstream from the appertaining mixing segment and, if applicable, also upstream from the appertaining metering element, in order to likewise heat up these components, a measure which additionally leads to improved evaporation of the aqueous urea solution and to more thorough mixing with the exhaust gas. During the heating phase using the burner, it can be advantageous to discontinue the metering of the aqueous urea solution, either temporarily or completely, as soon as the temperature of the exhaust gas, which has been heated up by the burner, has brought about a spontaneous combustion of the reductant. In this case, however, preference is given to reducing the heating output of the burner so as not to exceed an exhaust gas temperature of 450° C., preferably 400° C., especially preferably 350° C.

In a preferred embodiment of the invention, it is provided for the burner to have an output of at least 8 kilowatts, preferably between 8 and 20 kilowatts, especially preferably between 10 and 15 kilowatts. An essential advantage of an exhaust gas burner is that it has a higher output than an electric heating element. Whereas the output of an electric heating element is correspondingly limited by the battery current, especially in the case of a 12-volt on-board system but even in the case of a 48-volt on-board system and, since the output of the battery is greatly reduced particularly at cold outdoor temperatures, especially at temperatures below 0° C., a burner can generate a high exhaust heat output, essentially irrespective of the outdoor temperature and of the operation of the internal combustion engine, and this output can heat up the exhaust gas or the exhaust gas components situated in the exhaust gas channel downstream from the feed point for the exhaust gases of the burner.

Here, it is especially preferred for the burner to be operated with the same fuel as the internal combustion engine and especially for it to be supplied with fuel from a shared tank. In this manner, there is no need for an additional tank for the burner nor, if applicable, for an additional feed pump to supply fuel to the burner. Consequently, the burner can be connected to an existing fuel supply system relatively easily and inexpensively.

In a preferred embodiment of the exhaust gas aftertreatment system, it is provided for the first exhaust gas aftertreatment component for the selective, catalytic reduction of nitrogen oxides—as seen in the flow direction of the exhaust gas through the exhaust gas channel—to be a particulate filter with a coating for the selective, catalytic reduction of nitrogen oxides and it is provided for the second exhaust gas aftertreatment component for the selective, catalytic reduction of nitrogen oxides—which is situated downstream from the first exhaust gas aftertreatment component for the selective, catalytic reduction of nitrogen oxides—to be an SCR catalytic converter. Here, the burner is used exclusively to heat up the SCR catalytic converter, as a result of which no further exhaust gas components are heated up and the exhaust heat of the burner—except for minor losses—is used to heat up the SCR catalytic converter. In this process, the feed point of the hot combustion gases is preferably provided upstream from the second metering element in order to promote evaporation of the reductant, especially of an aqueous urea solution, and to promote the release of the ammonia obtained from it. During the heating phase using the burner, it can be advantageous to discontinue the metering of the aqueous urea solution, either temporarily or completely, as soon as the temperature of the exhaust gas, which has been heated up by the burner, has brought about a spontaneous combustion of the reductant. In this case, however, preference is given to reducing the heating output of the burner so as not to exceed an exhaust gas temperature of 450° C., preferably 400° C., especially preferably 350° C.

As an alternative, it is provided for the first exhaust gas aftertreatment component for the selective, catalytic reduction of nitrogen oxides—as seen in the flow direction of the exhaust gas through the exhaust gas channel—to be an SCR catalytic converter and for the second exhaust gas aftertreatment component for the selective, catalytic reduction of nitrogen oxides—which is situated downstream from the first exhaust gas aftertreatment component for the selective, catalytic reduction of nitrogen oxides—to be a particulate filter with a coating for the selective, catalytic reduction of nitrogen oxides. Here, the burner can be additionally used to heat the particulate filter up to its regeneration temperature. Therefore, a regeneration of the particulate filter can be initiated independently of the operating state of the internal combustion engine, whereby there is no need for measures within the engine to raise the exhaust gas temperature. Consequently, the combustion process can be configured optimally and the fuel consumption and/or the raw emissions from the internal combustion engine can be reduced, as a result of which an essentially emission-neutral regeneration of the particulate filter is possible. Moreover, the regeneration can be carried out without its having any effect on the power output of the internal combustion engine, so that a regeneration of the particulate filter can be carried out without any loss of comfort or power for the driver.

Here, it is preferable for a low-pressure exhaust gas return system to branch off from the exhaust gas channel downstream from the particulate filter at a branch, thereby connecting the exhaust gas channel to the intake system of the internal combustion engine upstream from the compressor of an exhaust gas turbocharger. Returning the exhaust gas downstream from the particulate filter ensures that the exhaust gas returned by the low-pressure exhaust gas return system is essentially free of particles and impurities. In this manner, it can be ensured that the returned exhaust gas does not cause damage to the compressor of the exhaust gas turbocharger or to the combustion chambers of the internal combustion engine.

It is preferable for the burner to be arranged downstream from the particulate filter and downstream from the branch for the low-pressure exhaust gas return system as well as upstream from the second SCR catalytic converter. This prevents some of the exhaust heat of the burner from being lost via the low-pressure exhaust gas return system since this exhaust heat would otherwise not be available to heat up the SCR catalytic converter.

In an advantageous improvement of the exhaust gas aftertreatment system, it is provided for at least a temperature sensor, a $NO_x$ sensor and/or a pressure sensor to be arranged in the exhaust gas system. A temperature sensor can regulate the heat input via the burner so that the exact quantity of energy is fed into the exhaust gas stream that is needed to reach the operating temperature of the exhaust gas aftertreatment components. Moreover, the burner can be switched off if this temperature is exceeded. In this manner, excessive consumption by the burner can be minimized. A $NO_x$ sensor can regulate the quantity of metered-in reductant in order to ensure the most efficient possible use of reductant.

According to the invention, a method for exhaust gas aftertreatment in an internal combustion engine having an exhaust gas aftertreatment system according to the invention is being proposed in which the temperature in the exhaust gas system is determined, especially the exhaust gas temperature downstream from the exhaust gas aftertreatment component for the selective, catalytic reduction of nitrogen oxides that is heated up by the burner, or else the temperature of an exhaust gas aftertreatment component is determined, especially an exhaust gas aftertreatment component for the selective, catalytic reduction of nitrogen oxides, and this temperature is then compared to a threshold temperature. In this process, the burner is activated once the determined temperature is below the threshold temperature. The proposed method makes it possible to heat up at least one SCR catalytic converter immediately after the cold start of the internal combustion engine, a process in which the operating temperature of the SCR catalytic converter is reached much more quickly, thanks to the heating output, which is high in comparison to that of electric heating elements. Consequently, the $NO_x$ emissions can be reduced, especially during the cold start phase but also after the vehicle has been idling or running at a low load for a while, during which time the SCR catalytic converter would otherwise have cooled off to below its operating temperature.

In another improvement of the method, it is provided for the burner to be deactivated again once the determined temperature is above a second threshold temperature. In this context, the first threshold temperature and the second threshold temperature can be the same. However, it is preferable for the second threshold temperature to be higher than the first threshold temperature, preferably 50° C. to 150° C., especially preferably 100° C. to 150° C., higher than the first threshold temperature. Switching off the burner above the second threshold temperature makes it possible to reduce excessive consumption by the burner. In this process, the burner preferably remains activated until the SCR catalytic converter downstream from the burner has reached a temperature at which a maximally efficient conversion of nitrogen oxides is achieved.

In another improvement of the method, it has been found to be advantageous for the output of the burner to be reduced or for the burner to be deactivated after a defined time interval. This can prevent the sensors and/or the exhaust gas aftertreatment components from being thermally damaged due to an uncontrolled and excessive heat input into the exhaust gas system.

Unless otherwise indicated in a specific case, the various embodiments of the invention cited in this application can be advantageously combined with each other.

BRIEF DESCRIPTION OF THE DRAWINGS

The invention will be explained below on the basis of embodiments with reference to the accompanying drawings. In this context, identical components or components having the same function are provided with the same reference numerals in the various figures. The following is shown.

DETAILED DESCRIPTION OF THE INVENTION

Figure 1:
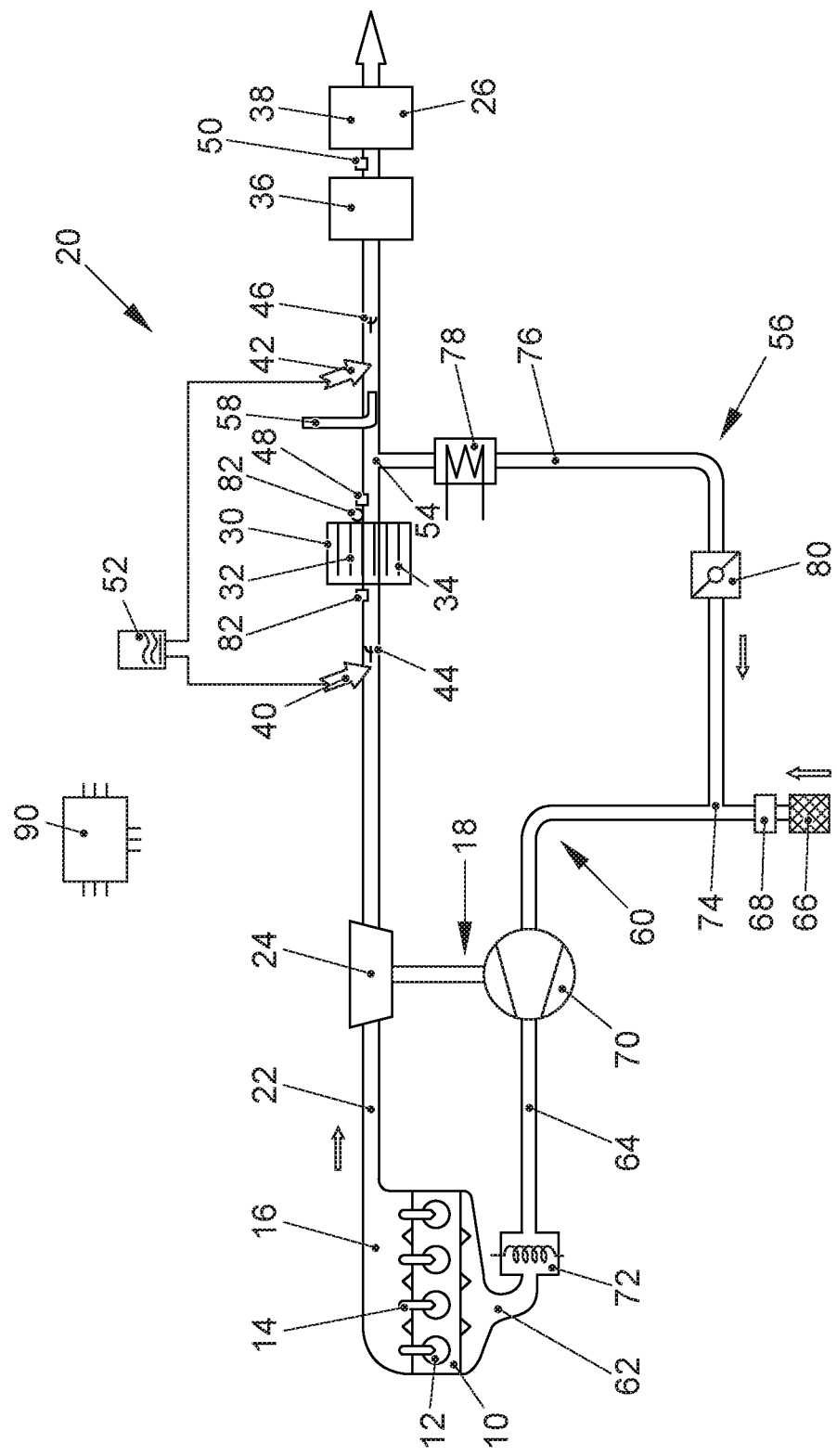
FIG. 1 is a schematic view of an internal combustion engine whose outlet is connected to an exhaust gas system and whose inlet is connected to an air supply system.

FIG. 1 shows the schematic view of an internal combustion engine 10 with an air supply system 60 and an exhaust gas system 20. In this embodiment, the internal combustion engine 10 is a direct-injection diesel engine and it has several combustion chambers 12. Each combustion chamber 12 has a fuel injector 14 that serves to inject fuel into the appertaining combustion chamber 12. The inlet 62 of the internal combustion engine 10 is connected to an air supply system 60 and its outlet 16 is connected to an exhaust gas system 20. The internal combustion engine 10 can have a high-pressure exhaust gas return system with a high-pressure exhaust gas return valve via which exhaust gas of the internal combustion engine 10 can be returned from the outlet 16 to the inlet 62. The combustion chambers 12 have inlet valves and outlet valves by means of which a fluidic connection from the air supply system 60 to the combustion chambers 12 or from the combustion chambers 12 to the exhaust gas system 20 can be opened or closed.

The air supply system 60 comprises an intake channel 64 which—as seen in the flow direction of fresh air through the intake channel 64—comprises an air filter 66, a mass air flow meter 68, especially a hot-film mass air flow meter that is situated downstream from the air filter 66, a compressor 70 of an exhaust gas turbocharger 18 that is situated downstream from the mass air flow meter 68, and an intercooler 72 that is situated further downstream. Here, the mass air flow meter 68 can also be arranged in a housing of the air filter 66 so that the air filter 66 and the mass air flow meter 68 form a module. Downstream from the air filter 66 and upstream from the compressor 70, there is a junction 74 where an exhaust gas return line 76 of a low-pressure exhaust gas return system 56 opens up into the intake channel 64.

The exhaust gas system 20 comprises an exhaust gas channel 22 in which—as seen in the flow direction of the exhaust gas of the internal combustion engine 10 through the exhaust gas channel 22—there is a turbine 24 of the exhaust gas turbocharger 18 that, by means of a shaft, drives the compressor 70 that is situated in the air supply system 60. The exhaust gas turbocharger 18 is preferably configured as an exhaust gas turbocharger 18 with a variable turbine geometry. For this purpose, there are adjustable guide vanes which are situated upstream from the wheel of the turbine 24 and with which the inflow of the exhaust gas onto the blades of the turbine 24 can be varied. Downstream from the turbine 24, there are several exhaust gas aftertreatment components 26, 30, 32, 34, 36, 38. Here, as the first exhaust gas aftertreatment component, a first exhaust gas aftertreatment component 30 for the selective, catalytic reduction of nitrogen oxides is arranged immediately downstream from the turbine 24. This first exhaust gas aftertreatment component 30 is configured as a particulate filter 32 with a coating 34 for the selective, catalytic reduction of nitrogen oxides (SCR coating). Downstream from this first exhaust gas aftertreatment component 30, there is a second SCR catalytic converter 36 and further downstream, there is an oxidation catalytic converter 26 that serves to convert unburned hydrocarbons and carbon monoxide. Furthermore, the oxidation catalytic converter can have an ammonia slip catalytic converter 38, which prevents unconsumed ammonia from escaping. Downstream from the turbine 24 and upstream from the particulate filter 32, there is a first metering element 40 with which a reductant 52, especially an aqueous urea solution, can be metered into the exhaust gas channel 22 of the internal combustion engine 10. Downstream from the first metering element 40 and upstream from the particulate filter 32, there can be a first exhaust gas mixer that serves to improve the mixing of the reductant 52 with the exhaust gas stream from the internal combustion engine 10 before it enters the particulate filter 32.

Downstream from the particulate filter 32 and upstream from the second SCR catalytic converter 36, the exhaust gas channel 22 has a branch 54 where a low-pressure exhaust gas return system 56 branches off from the exhaust gas channel 22, thereby connecting the exhaust gas channel 22 to the intake channel 64 upstream from the compressor 70. In addition to the exhaust gas return line 76, the low-pressure exhaust gas return system 56 comprises an exhaust gas return cooler 78 and an exhaust gas return valve 80 by means of which the return of exhaust gas through the exhaust gas return line 76 can be regulated. The exhaust gas return line 76 of the low-pressure exhaust gas return system 56 can have a temperature sensor 48 by means of which the exhaust gas temperature in the low-pressure exhaust gas return system 56 can be determined in order to activate the exhaust gas return system 56 as soon as the exhaust gas temperature in the exhaust gas return system 56 has exceeded a defined threshold value. This can prevent water vapor or reductant 52 for the selective, catalytic reduction of nitrogen oxides, especially a liquid urea solution that is contained in the exhaust gas, from condensing out and leading to damage or deposits in the low-pressure exhaust gas return system 56 or in the air supply system 60.

Downstream from the branch 54, the exhaust gas system 20 has a burner 58 by means of which the exhaust gas stream from the internal combustion engine 10 can be heated up before it enters the second SCR catalytic converter 36. Downstream from the burner 58 and upstream from the second SCR catalytic converter, there is a second metering element 42 that serves to meter in the reductant 52, whereby a second exhaust gas mixer 46 can be arranged downstream from said second metering element 42. Moreover, a temperature sensor 48 and/or a NOx sensor 50 can be arranged in the exhaust gas channel 22 in order to determine the temperature of the exhaust gas from the internal combustion engine 10 or the nitrogen oxide concentration in the exhaust gas, so that the reductant can be metered in as needed by using at least one of the metering elements 40, 42. Moreover, differential-pressure sensors 82 are provided in the exhaust gas system 20 in order to determine the pressure differential over the particulate filter 32. In this manner, the load state of the particulate filter 32 can be determined and a regeneration of the particulate filter 32 can be initiated once a defined load level has been exceeded.

The internal combustion engine 10 is connected to an engine control unit 90 that is connected via signal lines (not shown here) to a temperature sensor 48, to a $NO_x$ sensor 50, to a differential pressure sensor 82, to the fuel injectors 14 of the internal combustion engine 10 as well as to the metering elements 40, 42 and to the burner 58.

This engine control unit 90 regulates the injection quantity and the injection timing of the fuel into the combustion chambers 12 of the internal combustion engine 10 as well as the metering in of a reductant 52 for the selective, catalytic reduction of nitrogen oxides into the exhaust gas channel 22. Furthermore, the burner 58 is activated when the temperature of the exhaust gas or the temperature of an exhaust gas aftertreatment component 30, 32, 34, 36 for the selective, catalytic reduction of nitrogen oxides is below a threshold temperature $T_S$. The oxidation catalytic converter 26 can convert unburned hydrocarbons and carbon monoxide into carbon dioxide and water vapor. With an eye towards reducing emissions, the slip catalytic converter 38 prevents ammonia from escaping in case one of the metering elements 40, 42 has overdosed the aqueous urea solution.

Figure 2:
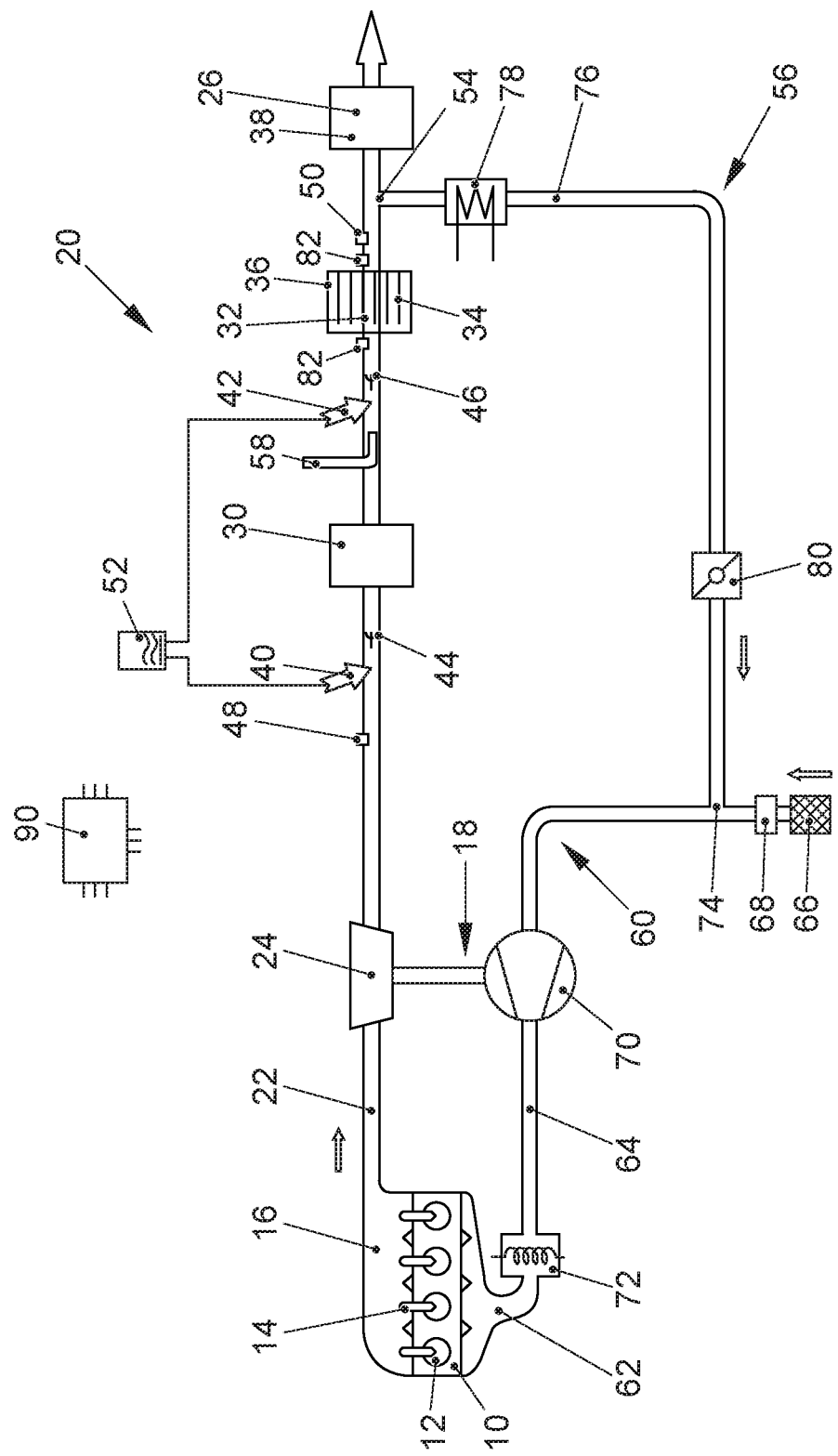
FIG. 2 is another schematic view of an internal combustion engine having an air supply system and an exhaust gas aftertreatment system according to the invention.

FIG. 2 shows an alternative embodiment of an exhaust gas aftertreatment system for an internal combustion engine 10. Since this configuration is essentially the same as explained for FIG. 1, only the differences from the embodiment shown in FIG. 1 will be discussed below. In the exhaust gas system 20, downstream from the turbine 24 of an exhaust gas turbocharger 18, an SCR catalytic converter 30 is provided as the first exhaust gas aftertreatment component 30 for selective, catalytic reduction. A particulate filter 32 with a coating 34 for the selective, catalytic reduction of nitrogen oxides—as the second exhaust gas aftertreatment component 36 for selective, catalytic reduction—is arranged downstream from the SCR catalytic converter 30. Here, the burner 58 is arranged downstream from the SCR catalytic converter 30 and upstream from the second metering element 42 that serves to meter in the reductant 52 for a selective, catalytic reduction of nitrogen oxides on the coated particulate filter 32. In this embodiment, the low-pressure exhaust gas return system 56 only branches off from the exhaust gas channel 22 upstream from the slip catalytic converter 38 behind the second exhaust gas aftertreatment component 36 for the selective, catalytic reduction of nitrogen oxides, namely, downstream from the particulate filter 32 with the coating 34 for selective, catalytic reduction. In this process, any soot emissions from the burner 58 that might occur can be cleaned by the particulate filter 32 so that the operation of the burner 32 does not lead to an increase in soot emissions. Thanks to the exhaust gas burner 58, the oxidation catalytic converter 26 can be immediately heated up to its operating temperature, especially after a cold start of the internal combustion engine 10. Consequently, the oxidation catalytic converter 26 can be installed in virtually any desired position in the exhaust gas system 20. Moreover, the arrangement of the burner 58 upstream from the particulate filter 32 offers the possibility to initiate the regeneration of the particulate filter 32 by means of the burner 58, that is to say, to initiate the oxidation of the soot particles that have been held back in the particulate filter 32, irrespective of the engine operating point of the internal combustion engine 10. Since the regeneration temperature of the particulate filter 32 is above the temperature window at which an efficient conversion of the nitrogen oxides is possible by means of selective, catalytic reduction, the burner 58 in this embodiment should have a higher output, especially an output between 15 kilowatts and 25 kilowatts.

Figure 3:
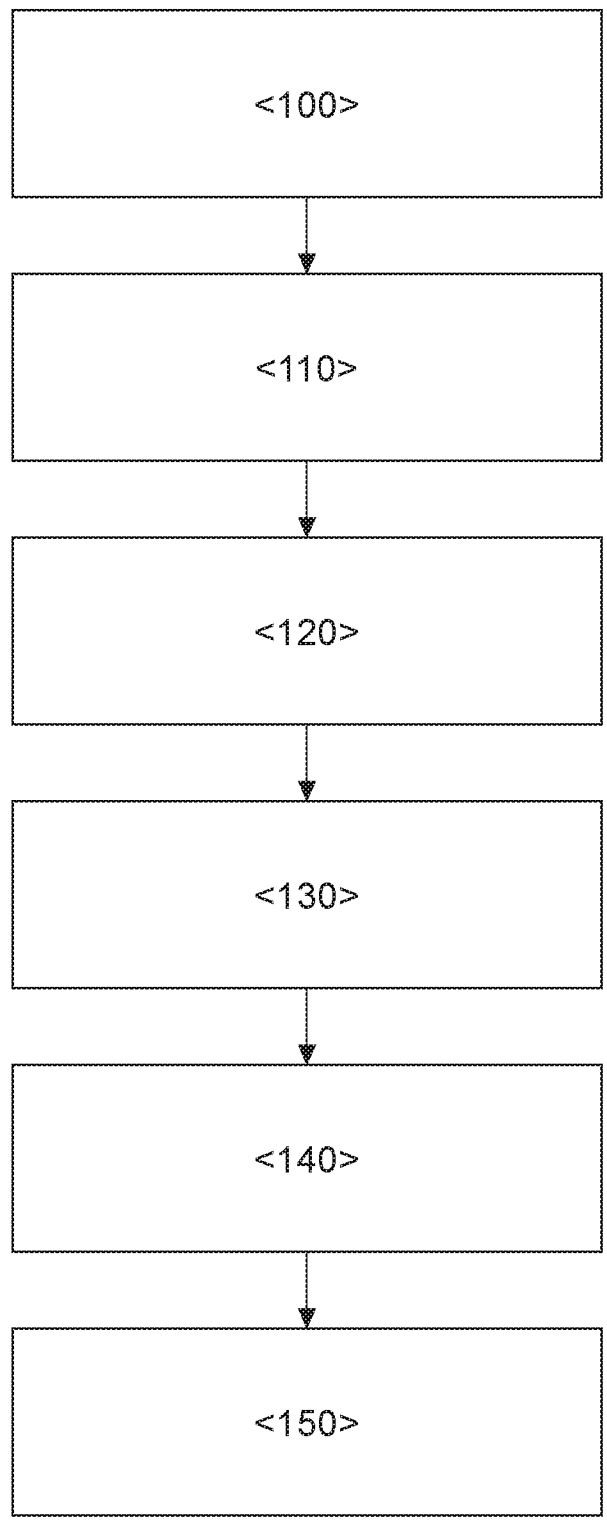
FIG. 3 is a flow diagram for carrying out a method according to the invention for exhaust gas aftertreatment in an internal combustion engine.

FIG. 3 shows a flow diagram for carrying out a method according to the invention for exhaust gas aftertreatment in an internal combustion engine 10. Here, in a first method step <100>, the temperature $T_{EG}$ in the exhaust gas system 20 of the internal combustion engine 10 is determined. This makes it possible to determine the exhaust gas temperature of the internal combustion engine 10 or the temperature of an exhaust gas aftertreatment component 26, 30, 32, 34, 36, 38, especially of an exhaust gas aftertreatment component 30, 32, 34, 36 for the selective, catalytic reduction of nitrogen oxides. In a second method step <110>, the determined temperature $T_{EG}$ is compared to a threshold temperature $T_S$. If the temperature $T_{EG}$ is below the threshold temperature $T_S$, then the burner 58 is activated in a method step <120> and the exhaust gas stream from the internal combustion engine 10 is heated up by the burner 58. The exhaust gas that has been heated up in this manner enters the second exhaust gas aftertreatment component 36 for selective, catalytic reduction—as seen in the flow direction—so that this second exhaust gas aftertreatment component 36 reaches its operating temperature immediately. Once this operating temperature has been reached, in a method step <130>, the second metering element 42 meters reductant 52 into the exhaust gas channel 22, a process in which the nitrogen oxides are reduced by means of the reductant 52 so as to form molecular nitrogen. Operating the internal combustion engine 10 heats up all of the exhaust gas aftertreatment components 26, 30, 32, 34, 36, 38 in the exhaust gas channel 22. Once the first exhaust gas aftertreatment component 30 for the selective, catalytic reduction of nitrogen oxides—as seen in the flow direction of the exhaust gas from the internal combustion engine 10—has reached its operating temperature, the burner 58 can be switched off in a method step <140> and the metering in of the reductant 52 can be switched over to the first metering element 40 in a method step <150>. As an alternative, the operation of the burner 58 can also be controlled as a function of time and its output can be reduced or switched off once a defined time interval has lapsed.

An exhaust gas aftertreatment system according to the invention can reduce the nitrogen oxide emissions that are heated up especially after a cold start of the internal combustion engine 10 or after the vehicle has been idling or running at a low load. Here, the selective, catalytic reduction of nitrogen oxides can be carried out essentially independently of the operating point of the internal combustion engine 10. Thus, high levels of efficiency in the conversion of nitrogen oxides are achieved, irrespective of the operating point of the internal combustion engine 10 and the position in the exhaust gas system 20. This gives rise to the option to install the SCR catalytic converters 30, 36 in virtually any desired position in the exhaust gas system.

LIST OF REFERENCE NUMERALS 10 internal combustion engine
12 combustion chamber
14 fuel injector
16 outlet
18 exhaust gas turbocharger
20 exhaust gas system
22 exhaust gas channel
24 turbine
26 oxidation catalytic converter
30 first SCR catalytic converter
32 particulate filter
34 SCR coating
36 second SCR catalytic converter
38 slip catalytic converter
40 first metering element
42 second metering element
44 first exhaust gas mixer
46 second exhaust gas mixer
48 temperature sensor
50 NO$_x$ sensor
52 reductant
54 branch
56 low-pressure exhaust gas return system
58 burner
60 air supply system
62 inlet
64 intake channel
66 engine control unit
68 mass air flow meter
70 compressor
72 intercooler
74 junction
76 exhaust gas return line
78 exhaust gas return cooler
80 exhaust gas return valve
82 differential pressure sensor
90 engine control unit

The invention claimed is:

1. An exhaust gas aftertreatment system for an internal combustion engine, comprising:
an exhaust gas system with an exhaust gas channel in which at least two exhaust gas aftertreatment components for the selective, catalytic reduction of nitrogen oxides are arranged,
a first exhaust gas aftertreatment component for the selective, catalytic reduction of nitrogen oxides arranged directly downstream from a turbine of an exhaust gas turbocharger,
a burner arranged downstream from the first exhaust gas aftertreatment component for the selective, catalytic reduction of nitrogen oxides and upstream from a second exhaust gas aftertreatment component for the selective, catalytic reduction of nitrogen oxides, with which burner the exhaust gas can be heated up before it enters the second exhaust gas aftertreatment component for the selective, catalytic reduction of nitrogen oxides, and
an oxidation catalytic converter arranged downstream from the second exhaust gas aftertreatment component for the selective, catalytic reduction of nitrogen oxides, which oxidation catalytic converter serves to convert unburned hydrocarbons,
wherein the first exhaust gas aftertreatment component for the selective, catalytic reduction of nitrogen oxides is a particulate filter with a coating for the selective, catalytic reduction of nitrogen oxides, and the second exhaust gas aftertreatment component is an SCR catalytic converter,
wherein a low-pressure exhaust gas return system branches off from the exhaust gas channel downstream from the particulate filter at a branch, and
wherein the burner is arranged downstream from the particulate filter and downstream from the branch as well as upstream from the second SCR catalytic converter.

2. The exhaust gas aftertreatment system according to claim 1, wherein the oxidation catalytic converter comprises an ammonia slip catalytic converter.

3. The exhaust gas aftertreatment system according to claim 1, wherein the first exhaust gas aftertreatment component is associated with a first metering element, and the second exhaust gas aftertreatment component is associated with a second metering element that serves to meter a reductant into the exhaust gas channel.

4. The exhaust gas aftertreatment system according to claim 1, wherein the burner has an output of at least 8 kilowatts.

5. A method for treating exhaust gas in an internal combustion engine having an exhaust gas aftertreatment system, wherein the exhaust gas aftertreatment system comprises:
an exhaust gas system with an exhaust gas channel in which at least two exhaust gas aftertreatment components for the selective, catalytic reduction of nitrogen oxides are arranged,
a first exhaust gas aftertreatment component for the selective, catalytic reduction of nitrogen oxides arranged directly downstream from a turbine of an exhaust gas turbocharger,
a burner arranged downstream from the first exhaust gas aftertreatment component for the selective, catalytic reduction of nitrogen oxides and upstream from a second exhaust gas aftertreatment component for the selective, catalytic reduction of nitrogen oxides, with which burner the exhaust gas can be heated up before it enters the second exhaust gas aftertreatment component for the selective, catalytic reduction of nitrogen oxides, and an oxidation catalytic converter arranged downstream from the second exhaust gas aftertreatment component for the selective, catalytic reduction of nitrogen oxides, which oxidation catalytic converter serves to convert unburned hydrocarbons, wherein the first exhaust gas aftertreatment component for the selective, catalytic reduction of nitrogen oxides is a particulate filter with a coating for the selective, catalytic reduction of nitrogen oxides, and the second exhaust gas aftertreatment component is an SCR catalytic converter, wherein a low-pressure exhaust gas return system branches off from the exhaust gas channel downstream from the particulate filter at a branch, and wherein the burner is arranged downstream from the particulate filter and downstream from the branch as well as upstream from the second SCR catalytic converter, the method comprising:

determining a temperature in the exhaust gas system, comparing the determined temperature to a threshold temperature, and activating the burner once the determined temperature is below the threshold temperature.

* * * * *